United States Patent Office 3,103,419
Patented Sept. 10, 1963

3,103,419
PROCESS FOR MAKING CHLORINE FROM
AMMONIUM CHLORIDE
Edward Hunter and Harry Smith, Northwich, England,
assignors to Imperial Chemical Industries Limited, London, England, a corporation of Great Britain
No Drawing. Filed May 14, 1962, Ser. No. 194,724
Claims priority, application Great Britain May 25, 1961
7 Claims. (Cl. 23—219)

This invention relates to a novel process for making chlorine, particularly to a cyclic process for making chlorine from ammonium chloride, and from hydrogen chloride.

Chlorine is made industrially on a large scale by the electrolysis of sodium chloride brine which yields at the same time equivalent quantities of caustic soda. When the demand for chlorine becomes so great that the equivalent caustic soda produced exceeds what industry needs, this process becomes less economic and it becomes desirable to find alternative processes for making chlorine that do not yield caustic soda at the same time. Chlorine-containing starting materials suitable for such alternative processes include hydrogen chloride, available as a by-product from organic chlorinations, ammonium chloride, for example as obtainable from an ammonia-soda process, and other readily available chlorides, for example sodium chloride. Of these ammonium chloride and hydrogen chloride are the most attractive since some processes starting with sodium chloride, for example electrolysis of the fused salt, or its reaction with nitric acid to give nitrosyl chloride, or its reaction with sulphur trioxide, possess unfavourable characteristics.

There are known processes for obtaining chlorine from ammonium chloride and from hydrogen chloride in which the overall effects are oxidations which may ideally be represented respectively by the equations

$$4NH_4Cl + O_2 = 4NH_3 + 2H_2O + 2Cl_2$$

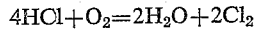

$$4HCl + O_2 = 2H_2O + 2Cl_2$$

Any departure from the effects represented by these equations is generally due to undesirable side reactions. The first equation may be considered as occurring in two stages, namely

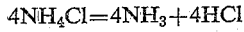

$$4NH_4Cl = 4NH_3 + 4HCl$$

and then

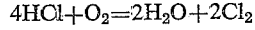

$$4HCl + O_2 = 2H_2O + 2Cl_2$$

and at given temperatures and pressures the minimum energy requirements for any cyclic process whose overall effect is as represented by the first two equations can never be less than those involved in these two stages.

Thus, in order to achieve a technical advance over known processes it is necessary to discover more convenient ways of bringing about the overall result, and one of these, which is the main object of our invention, is to operate the various stages at lower temperatures than have hitherto been found necessary.

According to one embodiment of our invention we provide a cyclic process for making chlorine comprising a first stage in which ammonium chloride, solid or in solution, is formed from ammonia by known methods; a second stage in which in an aqueous system said ammonium chloride and a chloride of a metal in a lower valency state and ammonia are reacted with oxygen or air or other oxygen-containing gas, whereby the metal chloride is oxidised to a higher chloride containing the metal in a higher valency state, said higher chloride then combining with the ammonia to give a precipitate of an ammine; a third stage in which said ammine after separation is heated to drive off ammonia but not to decompose the higher chloride, said ammonia being returned partly to the first stage and partly to the second stage; a fourth stage in which the higher chloride is heated to give chlorine and regenerate the lower chloride, said lower chloride being returned to the second stage.

The first stage, in which ammonium chloride is made, may be itself an essentially single-stage reaction, for example a direct combination between ammonia and hydrogen chloride, in which case the overall result of the process of our invention can be regarded as the manufacture of chlorine from hydrogen chloride. It may also constitute a part of another multi-stage process, for example the ammonia-soda process in which the essential formative reactions yield sodium bicarbonate and ammonium chloride in equivalent proportions. In the known ammonia-soda process ammonium chloride after separation from sodium bicarbonate is reacted with lime to recover ammonia for re-use in the process. If the process of our invention were integrated with an ammonia-soda process ammonia liberated in the third stage would be returned for re-use to the ammonia-soda process.

The ammonium chloride may be introduced in solid form into the second stage of the process. It may also be introduced as an aqueous solution and this solution may contain other dissolved electrolytes, for example sodium chloride, provided they do not interfere with the formation and separation of the metal chloride ammine.

If the ammonium chloride is made by reaction between ammonia and hydrogen chloride, the first and second stages may if desired be combined to give a first stage in which hydrogen chloride or ammonia is led into respectively an aqueous ammoniacal or hydrochloric acid solution or suspension of the lower metal chloride and the system thereafter aerated with air or oxygen to oxidise the metal chloride.

Metals whose chlorides are suitable for use in the process include copper, cobalt, chromium. Of these it is convenient to use copper and hence to base the process on the oxidation of cuprous chloride to cupric chloride and the formation from the latter of a cupric chloride ammine. One of the important features of our invention is to have discovered the conditions under which a cupric chloride ammine of the desired thermal stability and low solubility is produced. We have found how to make such an ammine that under atmospheric pressure gives up all its ammonia at or near 250° C. in a reasonable time. At pressures below atmospheric lower temperatures are sufficient, for example 200°–205° C. Since these temperatures are well below 450° C. at which cupric chloride begins to give up chlorine, contamination of chlorine with ammonia can be avoided.

In one way of forming the ammine ammonium chloride and cuprous chloride and ammonia are brought together in an aqueous system in such proportions as after oxidation would yield an ammine concentration equivalent to about six molar in cupric copper, since the amine is then precipitated within a temperature range of about 20°–

70° C. If the ammine concentration is markedly less, for example less than about four molar in cupric copper, lower temperatures for example 0° C. are required for its precipitation from aqueous systems, but in mixed aqueous/non-aqueous systems for example acetone/water mixtures precipitation may be brought about without the need for cooling.

We find that at much lower concentrations of the cuprous chloride, ammonium chloride and ammonia, for example 0.5 molar, a basic cupric chloride is formed. This is not a useful product since its formation does not require consumption of ammonium chloride, thus for the lowest basic chloride known the reaction is $$4CuCl + O_2 \rightarrow 2CuO \cdot CuCl_2$$

and with the one we have isolated, namely $CuCl_2 \cdot 2CuO$, its formation is accompanied by conversion of ammonia to ammonium chloride according to the equation $$12CuCl + 4NH_3 + 3O_2 + 2H_2O \rightarrow 4CuCl_2 \cdot 2CuO + 4NH_4Cl$$

Thus the preferred concentrations for the ammine-forming stage at temperatures of 20°-70° C. are from 4 to 6 molar in cuprous chloride and ammonium chloride and from 12 to 18 molar in ammonia. These yield a precipitate of the ammine $2CuCl_2 \cdot 5NH_3 \cdot 4H_2O$ which on drying gives the diammine $CuCl_2 \cdot 2NH_3$.

The thermal decomposition of the diammine $$CuCl_2 \cdot 2NH_3$$

is rapid at 275° C., but some ammonium chloride is formed which indicates that the reaction proceeds beyond the ideal stage represented by the equation $$CuCl_2 \cdot 2NH_3 \rightarrow CuCl_2 + 2NH_3$$

In the temperature range 200°-250° C. a reasonably fast rate of decomposition can be achieved without the undesirable side-reactions noticed at 275° C. being prominent. Thus at 230° C. and at atmospheric pressure in the presence of an inert carrier gas, for example nitrogen, about 80% of the ammonia lost by the ammine is recovered unchanged. The presence of some ammonium chloride vapour along with ammonia in the volatile products, and of cuprous copper in the solid residue indicates that a side reaction is occurring to some extent. The effect of reducing the pressure to a few millimetres of mercury is to increase the rate of reaction considerably, and to reduce the extent of the side reaction. By also reducing the temperature the side reaction is reduced to very minor proportions; for example at 180° C. 96% of the ammonia lost by the diammine is recovered unchanged, but the reaction rate falls. Increasing the rate of flow of carrier gas at temperatures of 220°-230° C. increases the degree of recovery of ammonia. One convenient way of securing rapid flow of carrier gas is to disperse the solid ammine with silica wool in the form of a fixed bed through which the carrier gas is passed. The useful range of decomposition temperatures can thus be described as 200°-250° C. within which the preferred temperature is between 220° and 230° C. at atmospheric pressure.

The thermal decomposition of the cupric chloride obtained from the ammine has to take place at a temperature above 450° C. in order to produce chlorine at one atmosphere pressure, preferably above 500° C.

In the examples below the first illustrates the formation of the cupric chloride diammine; the second the thermal decomposition of the ammine at atmospheric pressure, and the third the effect of a reduced pressure of less than 5 mms. of mercury.

*Example 1*

160 g. solid ammonium chloride and 297 g. solid cuprous chloride were mixed with 409 g. of an aqueous solution of ammonia that contained 306 g. $NH_3$ per litre, and stirred until a clear solution was obtained. Into this was passed oxygen at an initial rate of about 530 mls./minute, the rate being thereafter gradually diminished in order that all the oxygen might be absorbed and substantially none bubble through and in escaping carry away ammonia. The solution was well stirred whilst the oxygen was being absorbed, and the temperature rose from 20° C. to between 65° and 70° C. over a period of 115 minutes, during which a turquoise-blue solid was gradually precipitated.

Analysis of this solid after separation and centrifuging to remove mother liquor indicated it to have the approximate composition $2CuCl_2 \cdot 5NH_3 \cdot 4H_2O$. Drying at 105° C. removed substantially all the water of crystallisation and the remaining solid contained 20.6 g. $NH_3$, 37.6 g. cupric copper, and 41.8 g. Cl per 100 g., which corresponds to $CuCl_2 \cdot 2NH_3$.

*Example 2*

| Temp., °C. | Gas flow, cc./min. | $NH_3$ present in diammine | $NH_3$ in volatile products | $NH_3$ as $NH_4Cl$ in volatile products | $NH_3$ left in solid residue |
|---|---|---|---|---|---|
| 230 | 160 | 0.02398 | 0.00257 | 0.00031 | 0.0209 |
| 230 | 375 | 0.02392 | 0.00497 | 0.00107 | 0.0176 |
| 230 | 750 | 0.02381 | 0.00542 | 0.00101 | 0.0174 |
| 240 | 375 | 0.02355 | 0.00563 | 0.00088 | 0.0161 |
| 250 | 375 | 0.02417 | 0.01143 | 0.00225 | 0.0081 |

Reaction time was one hour in each experiment and nitrogen was used as carrier gas at atmospheric pressure; $NH_3$ is expressed as g. moles.

*Example 3*

| Temp., °C. | Gas flow, cc./min. | Duration of expt., hrs. | $NH_3$ present in diammine | $NH_3$ in volatile products | $NH_3$ left in solid residue |
|---|---|---|---|---|---|
| 230 | a 400 | 1½ | 0.02267 | 0.00610 | 0.01516 |
| 230 | b 400 | 1½ | 0.02496 | 0.00676 | Not detd. |
| 230 | c nil | 1 | 0.02378 | 0.01895 | Not detd. |
| 200 | c nil | 2 | 0.02378 | 0.01596 | 0.00655 |
| 180 | c nil | 3 | 0.02372 | 0.01192 | 0.01130 | a Carrier gas nitrogen.
b Carrier gas carbon dioxide.
c No carrier gas used—pressure maintained at less than 5 mm. Hg by pumping and condensing products in liquid-air trap.
$NH_3$ is expressed as g. moles.

What we claim is:

1. A cyclic process for making chlorine comprising the steps of providing ammonium chloride in a first stage, feeding said ammonium chloride to a second stage containing an aqueous system, reacting said ammonium chloride and a chloride of a metal in a lower valency state and ammonia with an oxygen-containing gas in said aqueous system whereby the metal chloride is oxidised to a higher chloride containing the metal in a higher valency state, said metal being selected from the group consisting of copper, cobalt and chromium, said higher chloride then combining with the ammonia to give a precipitate of an ammine, feeding said ammine to a third stage in which said ammine after separation is heated to drive off ammonia but not to decompose the higher chloride, said ammonia being returned partly to the first stage and partly to the second stage, separating out the higher chloride into a fourth stage in which the higher chloride is heated to give chlorine and regenerate the lower chloride, said lower chloride being returned to the second stage.

2. A process for making chlorine from ammonium chloride comprising reacting ammonium chloride in an aqueous system with cuprous chloride and ammonia and air to form a cupric chloride ammine, separating said ammine and heating it to a temperature high enough to drive off ammonia and leave cupric chloride but not so high as to decompose said cupric chloride, separating said ammonia and said cupric chloride and heating said cupric chloride to a temperature high enough to cause it to liberate chlorine and regenerate cuprous chloride.

3. A process as claimed in claim 2 in which the reaction is carried out at a temperature of 20° to 70° C., the initial concentrations of ammonium chloride and cuprous chloride are each from 4 to 6 molar and that of ammonia is 12 to 18 molar.

4. A process as claimed in claim 2 in which the cupric chloride ammine is heated to drive off ammonia at a temperature of 200° to 250° C., under atmospheric pressure.

5. A process as claimed in claim 2 in which the cupric chloride ammine is heated to drive off ammonia at a temperature of 220° to 230° C. under atmospheric pressure.

6. A process as claimed in claim 3 in which the cupric chloride ammine is heated to drive off ammonia at a temperature of 180° to 230° C. under less than atmospheric pressure.

7. A process for making chlorine from ammonium chloride comprising reacting ammonium chloride and cuprous chloride and ammonia in an aqueous system with air at 20° to 70° C., the concentrations of ammonium chloride and cuprous chloride each being from 4 to 6 molar and that of ammonia being from 12 to 18 molar, separating the resulting precipitate of cupric chloride ammine and heating it under atmospheric pressure at 200° to 250° C. to liberate ammonia and form cupric chloride, thereafter obtaining chlorine from said cupric chloride by heating it at a temperature above 450° C. whereby chlorine is liberated and cuprous chloride regenerated.

References Cited in the file of this patent
UNITED STATES PATENTS
2,418,931    Gorin _____ Apr. 15, 1947